Jan. 1, 1946. D. T. DOWNES 2,392,130
SUPPORTING STRUCTURE FOR LAMINATED UNITS
Filed April 23, 1943
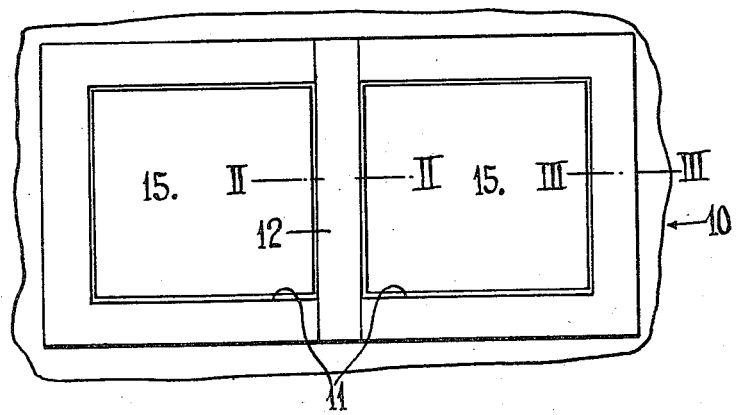
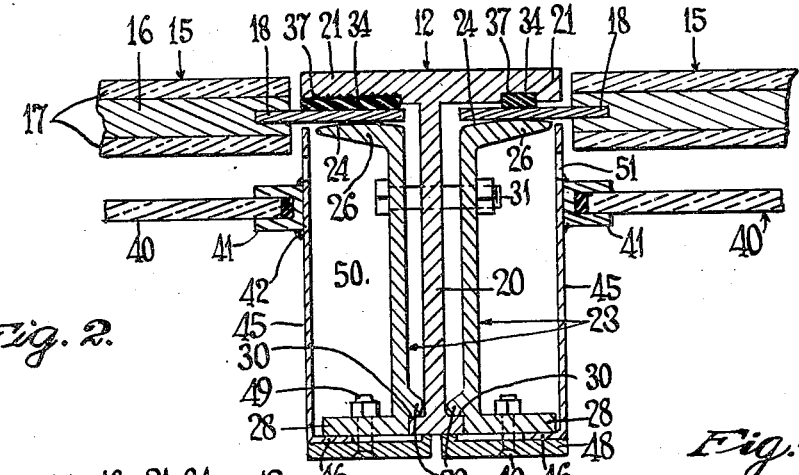
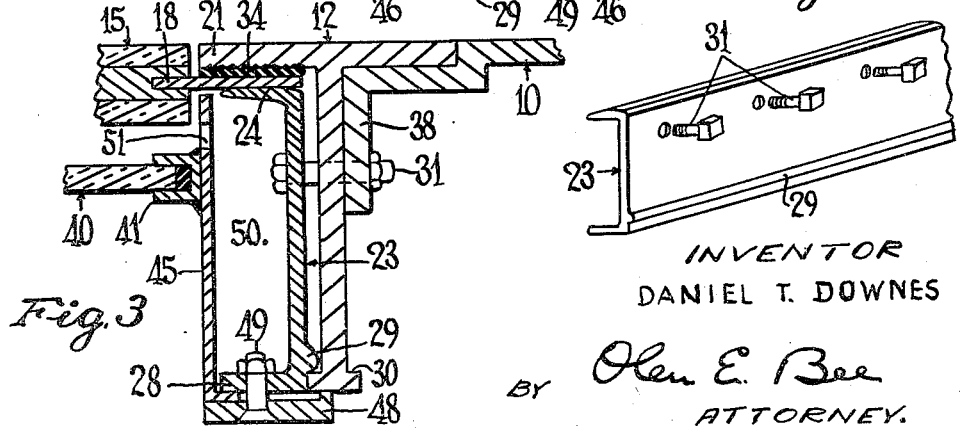
INVENTOR
DANIEL T. DOWNES
BY Olen E. Bee
ATTORNEY.

Patented Jan. 1, 1946

2,392,130

UNITED STATES PATENT OFFICE 2,392,130

SUPPORTING STRUCTURE FOR LAMINATED UNITS

Daniel T. Downes, Creighton, Pa., assignor to Pittsburgh Plate Glass Company, Allegheny County, Pa., a corporation of Pennsylvania Application April 23, 1943, Serial No. 484,190

4 Claims. (Cl. 20—56.5)

This invention relates to transparent closure structures and it has particular relation to surrounding supports for such structures in which laminated glass units are flexibly mounted in wall sections.

One object of the invention is to provide an improved clamping and supporting structure for securing flexible marginal portions of laminated units in connection with the mounting of the latter.

Another object of the invention is to provide a combined clamping and supporting structure for mounting flexible marginal portions of laminated units of double glazed installations.

In the drawing:

Fig. 1 is a fragmentary side elevation of a wall section including a window supporting structure embodying the invention; Fig. 2 is a horizontal section on a larger scale taken substantially along the line II—II of Fig. 1; Fig. 3 is a horizontal section, on a larger scale, taken substantially along the line III—III of Fig. 1; and Fig. 4 is a fragmentary perspective of a channel clamping element included in the structure shown in the other figures.

In practicing the invention a wall section 10, which can be a part of an airplane compartment, vehicle, or other structure, is provided with openings 11 separated by a frame member or pier 12 that is rigidly mounted in, and forms a part of, the wall section 10. A laminated unit 15 is disposed in each opening 11 and comprises a sheet of interlayer 16 of organic plastic, such as vinyl acetal resin, or other resin that is adapted to be employed as interlayer material in manufacturing laminated glass. Plates of glass 17 are bonded upon opposite sides of interlayer. The edges of the sheet interlayer and the glass plates are substantially co-incidental. Flexible resilient sheet metal 18 in strip form is disposed between the marginal portions of the glass plates and is bonded to the sheet interlayer in such manner that the metal does not touch the glass. The strip metal extends entirely around the perimeter of each laminated glass unit and constitutes a flexible resilient mounting flange that can be suitably connected to a supporting structure.

The central pier 12 is in the form of a T-beam having a web 20 and integral flanges 21 extending in opposite directions to form substantially a continuation of the outer surface of the wall section. This pier also includes a pair of channel clamping members 23 opening in opposite directions and disposed with their outer web surfaces in opposed relation to the web 20 of the T-beam. Each channel member has a convex surface 24 along one of its flanges 26 while the other flange 28 is flat and forms an angular extension of a portion of the clamping member opposite the convex surface. Ribs 29 are formed longitudinally on the channel members 23 along outside surfaces of their webs adjacent the flanges 28 and these ribs fulcrum upon shoulders 30 formed upon opposite sides of the web 20. Bolts 31 extend through the web 20 and through the channel members 23, and by tightening these bolts, the strip metal border 18 can be wedged or clamped securely between the convex surfaces 24 and the undersides of the flanges 21. Great pressure can thus be applied to this strip metal 18 for securing it in place without exerting any pressure upon the glass of the laminated units 15.

If desired, cushioning material 34 can be disposed between the strip metal and the underside of the T-flanges to insure fluid-tight joints entirely around the laminated unit. Indentations 37 are formed on the undersides of the flanges 21 to facilitate adherence of the cushioning material to such flanges. The edges of the glass units 15 are spaced from the edges of the pier, although a resilient and strong connection therebetween is effected by the intervening strip metal 18.

Along the glass edges other than those connected directly to the T-beam 12, a similar arrangement (Fig. 3) is provided for connection of the units to the wall section 10. However, in this arrangement only one channel member 23 is required and the wall section 10 is connected directly to the T-beam by means of the bolts 31 which extend in this instance through a flange 38 of the wall section, as well as through the channel member 23. Otherwise this construction is the same as that shown in Fig. 2.

An arrangement of the kind described above can be combined with additional panel units 40 which are mounted in metal channels 41 welded, as indicated at 42, upon outer sides of metal angle strips 45. Flanges 46 of these strips overlap behind the flanges 28 of the channel members 23 and are secured thereto by means of clamping plates 48 tightened and held in place by bolts 49 which extend therethrough and through the channel flanges 28. The inner panels 40 can thus be removed without disturbing the remainder of the structure. The angle strips 45, together with the pier structure, form chambers 50 communicating by means of openings 51 with the space between the units 15 and 40. Air at desired high or low temperatures can be circulated through these passages from a suitable source (not shown) and in a well known manner.

Although only one form of the invention has been shown and described in detail, it will be apparent to those skilled in the art that the invention is not so limited, but that various changes can be made therein without departing from the spirit of the invention or from the scope of the appended claims.

I claim:

1. In a multiple glazed closure structure including a laminated glass unit having a flexible mounting border, a frame member having a flange under which the mounting border is adapted to rest, a fulcrum on the frame remote from the flange, a clamping channel member rockable on said fulcrum and having a clamping face movable toward the frame flange in clamping and wedging relation therewith in response to rocking action of the clamping member on said fulcrum, sheet metal supports mounted upon the clamping member and substantially closing the channel portion thereof to form an air chamber, means on the sheet metal for supporting a panel of the multiple glazed structure, and means for drawing the frame member and clamping member toward each other into their clamping and wedging relation.

2. In a multiple glazed closure structure including a laminated glass unit having a flexible mounting border, a frame having a web and flanges extending oppositely from one extremity of the web to define substantially a T-shaped frame, fulcrum shoulders on the web remote from the flanges, channel members opening in opposite directions and disposed on opposite sides of the web and rockable on said fulcrums, said channel members having convex faces movable toward inner sides of the respective flanges to coact therewith in clamping relation in response to rocking of the channel members upon said fulcrums, sheet metal supports secured to each channel member for supporting a panel of the multiple glazed structure thereon and means for drawing said channel members toward each other in their rocking action on the fulcrums.

3. In a multiple glazed closure structure for a wall opening, an interlayer sheet of organic plastic, glass plates bonded to opposite sides of the interlayer sheet and defining therewith a laminated unit, flexible metal in strip form anchored in the plastic interlayer between the marginal portions of the plates and extending beyond the glass edges, a stationary frame support extending along and having a section overlapping the outer marginal portion of the strip metal, a movable clamping member having a convex clamping face for confining the marginal portion of the strip metal against said overlapping section, a stationary fulcrum member on said frame support engaging a portion of said clamping member for the latter to tilt thereon, an angular extension on a portion of the clamping member remote from its convex face, means for supporting a panel of the multiple glazed structure upon said extension, and means connected to said member and support for drawing the clamping face in wedging relation against the strip metal and thereby clamping the latter between said section and face.

4. In a multiple glazed closure structure including a laminated glass unit having a flexible mounting border, a stationary frame member having a flange under which the mounting border is adapted to rest, a stationary fulcrum on the frame remote from the flange, a movable clamping member rockable on said fulcrum and having a clamping face movable toward the frame flange in clamping and wedging relation therewith in response to rocking action of the clamping member on said fulcrum, sheet metal supporting means secured to the clamping member for supporting a panel of the multiple glazed structure thereon, and means for drawing the clamping member toward the stationary frame member into their clamping and wedging relation.

DANIEL T. DOWNES.